United States Patent
Gilbert et al.

(10) Patent No.: US 7,124,229 B2
(45) Date of Patent: Oct. 17, 2006

(54) METHOD AND APPARATUS FOR IMPROVED PERFORMANCE FOR PRIORITY AGENT REQUESTS WHEN SYMMETRIC AGENT BUS PARKING IS ENABLED

(75) Inventors: Jeffrey D. Gilbert, Portland, OR (US); Harris D. Joyce, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 145 days.

(21) Appl. No.: 10/980,737

(22) Filed: Nov. 2, 2004

(65) Prior Publication Data

US 2006/0095636 A1    May 4, 2006

(51) Int. Cl.
*G06F 13/00* (2006.01)
(52) U.S. Cl. ...................... 710/309; 710/113
(58) Field of Classification Search ............... None
See application file for complete search history.

(56) References Cited

U.S. PATENT DOCUMENTS

| | | | | |
|---|---|---|---|---|
| 5,581,782 A | * | 12/1996 | Sarangdhar et al. | 710/119 |
| 5,935,230 A | * | 8/1999 | Pinai et al. | 710/111 |
| 6,571,306 B1 | * | 5/2003 | Smith | 710/240 |

* cited by examiner

*Primary Examiner*—Glenn A. Auve
(74) *Attorney, Agent, or Firm*—Guojun Zhou (57) ABSTRACT

A method and apparatus for improved performance for handling priority agent bus requests when symmetric agent bus parking is enabled is disclosed. In one embodiment, a modified priority agent may be used. The modified priority agent may assert an unused symmetric agent bus request when it asserts its priority agent bus request. When a symmetric agent parks on the bus, continually asserting its symmetric agent bus request, the assertion of the otherwise unused symmetric agent bus request may cause the symmetric agent to withdraw its symmetric agent bus request. This may reduce bus response time for subsequent modified priority agent bus requests.

26 Claims, 6 Drawing Sheets

METHOD AND APPARATUS FOR IMPROVED PERFORMANCE FOR PRIORITY AGENT REQUESTS WHEN SYMMETRIC AGENT BUS PARKING IS ENABLED

FIELD

The present disclosure relates generally to bus-based processor systems, and more specifically to bus-based processor systems that permit symmetric arbitration agents to park on the bus.

BACKGROUND

Bus-based processor systems are commonly used in current architectures. Using a bus allows one or more processors or other devices (all of which may be commonly called "agents" of the bus) to share system resources, such as system memory and input/output (I/O) devices. An example of such a bus is the Front Side Bus (FSB) designed for use with Pentium® class compatible microprocessors such as those produced by Intel ® Corporation. Generally only one of the processors or other agents may use the bus at a given time. If a single agent requests access to the bus, it may use it. However, often multiple agents request access to the bus at roughly the same time. In this case, a process of determining which agent may have access, called an "arbitration", may be performed.

One form of arbitration, called priority arbitration, gives to a priority agent the ability to assert a bus request that overrides other agents' bus requests. Priority arbitration may be useful for agents, such as I/O devices, that require quick access but not necessarily with high bandwidth requirements. Priority agents may use a relatively simple request and grant logic to gain access to the bus. Another form of arbitration, called symmetric arbitration, permits symmetric agents to arbitrate amongst themselves in a distributed fashion, and grant bus access in a fair manner. This fair manner may include round-robin grants of access. Symmetric agents were originally so labeled because they contain state machines of a common design, therefore permitting them to decide among themselves which symmetric agent should next have bus access. Symmetric arbitration may be useful for agents, such as processors, that may have higher bandwidth requirements but may not need immediate access to the bus. Busses may support both priority arbitration and symmetric arbitration for various connected agents.

In some situations, such as when an agent determines that data exchanges on the bus will be of high bandwidth for limited periods of time (often called "bursty"), a symmetric agent may continuously assert its symmetric agent bus request signal. This process may be referred to as "bus parking". Bus parking may avoid time delays associated with the arbitration processes when that agent would likely be granted the bus by the arbitration process. However, bus parking may simply shift the time delay to the processing of priority agent bus request signals.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The following description describes techniques for improved performance for handling priority agent bus requests when symmetric agent bus parking is enabled. In the following description, numerous specific details such as logic implementations, software module allocation, bus and other interface signaling techniques, and details of operation are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation. In certain embodiments the invention is disclosed in the form of a multiple processor implementations of Pentium ® compatible processors such as those produced by Intel ® Corporation. However, the invention may be practiced with other kinds of processors, such as an Itanium ® Processor Family compatible processor or an X-Scale ® family compatible processor, or indeed of generalized bus agents that may not be processors.

Figure 1:
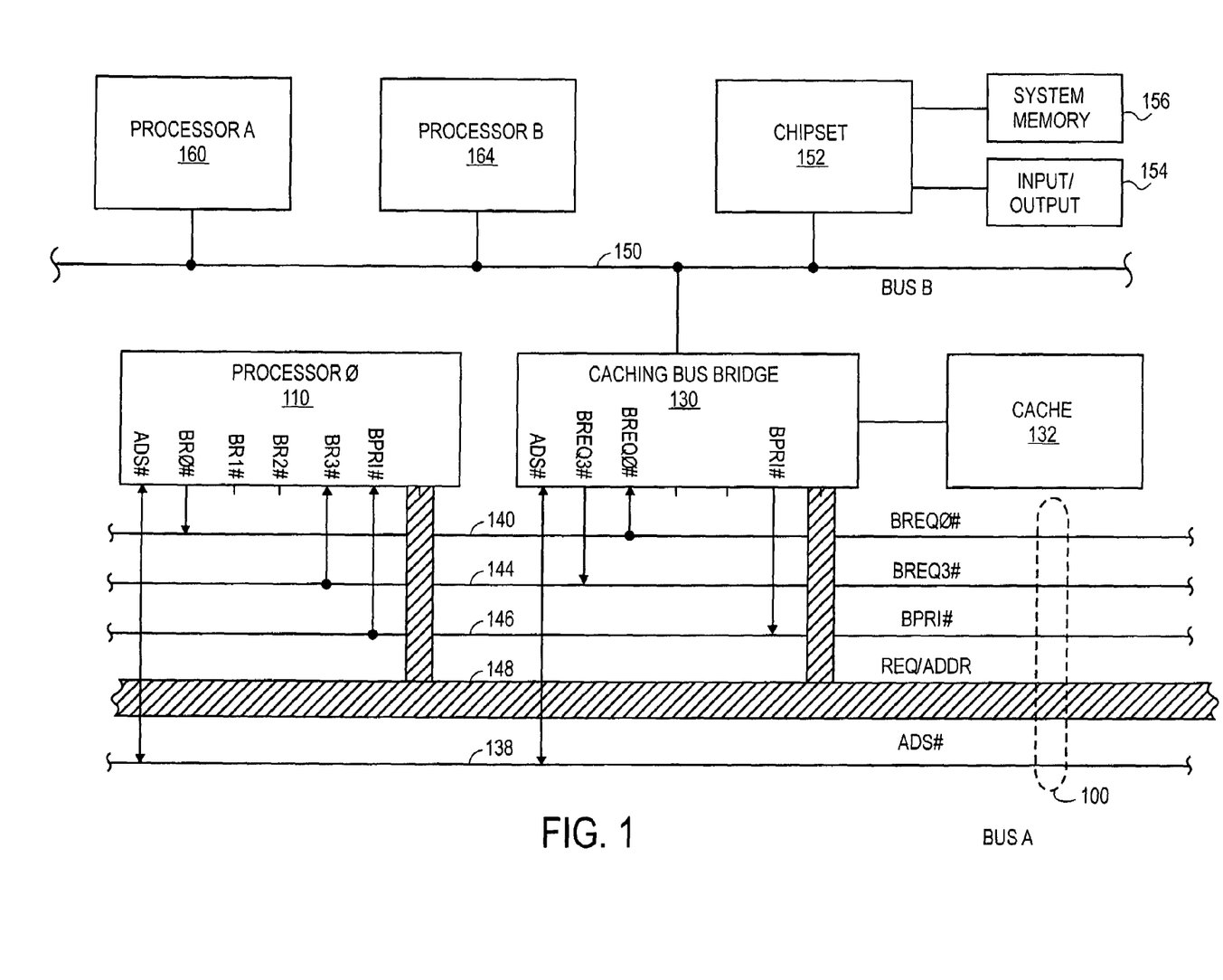
FIG. 1 is a system schematic diagram of a system to permit improved performance for priority agent bus requests, according to one embodiment.

Referring now to FIG. 1, a system schematic diagram of a system to permit improved performance for priority agent bus requests is shown, according to one embodiment. Processor 0 110 and caching bus bridge 130 are shown coupled via bus A 100. In other embodiments, other processors, chipsets, bus bridges, and other agents could be connected to bus A 100. In one embodiment, bus A 100 may be a front side bus (FSB) utilized with Pentium® class compatible microprocessors such as those manufactured by Intel® Corporation. In other embodiments, other busses may be used.

Processor 0 110 may act as a symmetric agent on bus A 100. Processor 0 110 may drive its symmetric agent bus request BR0# signal out over bus signal BREQ0# 140 of bus A 100. Processor 0 110 may receive a symmetric agent bus request BR3# signal from bus signal BREQ3# 144 and may receive a priority agent bus request BPRI# signal from bus signal BPRI# 146. In other embodiments, other symmetric agent bus request and priority agent bus request signals may be used.

Caching bus bridge 130 may generally act as a modified priority agent on bus A 100. In common with existing priority agents, caching bus bridge 130 may drive its priority agent bus request BPRI# signal out over bus signal BPRI# 146 of bus A 100. However, caching bus bridge 130 may also drive a symmetric agent bus request BREQ3# signal out over bus signal BREQ3# 144 and may also receive a symmetric agent bus request BREQ0# signal from bus signal BREQ0# 144.

Caching bus bridge 130 may signal its intention to exchange data over bus A 100 by asserting priority agent bus request BPRI# 146 signal. In situations where processor 0 110 has not asserted the BREQ0# signal, once caching bus bridge 130 asserts BPRI# 146, it may assert its address strobe ADS# 138 signal one clock cycle later. The assertion of the ADS# 138 signal may indicate that the data presented on the bus request/address lines REQ/ADDR 148 is valid.

However, when processor 0 110 has asserted the BREQ0# 140 signal, once caching bus bridge 130 asserts BPRI# 146, it may need to wait until three clock cycles elapse before it may safely assert its address strobe ADS# 138 signal. Such a waiting period may be enforced by the bus protocol for bus A 100. This may waste two clock cycles to overhead when compared to the situation where processor 0 110 has not asserted the BREQ0# 140 signal.

Processor 0 110 may additionally "park" on bus A 100 by keeping BREQ0# 140 asserted for a considerable period of time. This may be advantageous for processor 0 110 if it wishes to initiate multiple data exchanges in a given period of time. If other symmetric agents do not assert their corresponding symmetric agent bus request signals, processor 0 110 generally does not need to relinquish the bus, and therefore de-assert the BREQ0# 140 signal. In this situation, when caching bus bridge 130 merely asserts the BPRI# 146 signal, it may need to wait until three clock cycles have passed before asserting ADS# 138 for each data transfer desired.

Therefore, in one embodiment caching bus bridge 130 may also assert a symmetric agent bus request BREQ3# 144 signal at roughly the same time it asserts the BPRI# 146 signal. If the processor 0 110 is not asserting BREQ0# 140, once caching bus bridge 130 asserts BPRI# 146, it may assert its address strobe ADS# 138 signal one clock cycle later. If the processor 0 110 is asserting BREQ0# 140, once caching bus bridge 130 asserts BPRI# 146, it may assert its address strobe ADS# 138 signal three clock cycles later. And, since the caching bus bridge 130 is also asserting BREQ3# 144, by the symmetric arbitration rules implemented by bus A 100 this will cause processor 0 110 to relinquish the bus A 100. As part of this relinquishing, processor 0 110 may de-assert BREQ0# 140 and subsequently leave it de-asserted until such time as processor 0 110 is actually ready to request the usage of bus A 100.

In either case, when caching bus bridge 130 next asserts BPRI# 146, it should generally find BREQ0# 140 de-asserted. For this reason, on a second and subsequent data exchange initiated by caching bus bridge 130, when caching bus bridge 130 asserts BPRI# 146 it may assert ADS# 138 signal one clock cycle later, and not three clock cycles later. BREQ0# 140 would generally only be found re-asserted in situations when processor 0 110 would again be actually ready to request the usage of bus A 110.

If the caching bus bridge 130 asserts BREQ3# 144 when BREQ0# 140 is not asserted, this should not cause the bus A 100 to take any particular action, as an actual symmetric agent driving BREQ3# 144 is not present. However, in one embodiment, caching bus bridge 130 may receive and examine the status of BREQ0# 140 on one of its bus request input lines, such as BREQ0#. In this embodiment, caching bus bridge 130 may only assert BREQ3# 144 when BREQ0# 140 is determined to be asserted.

Caching bus bridge 130 may also be connected with bus B 150, which may connect additional processors processor A 160 and processor B 164 as well as a chipset 152. Data to be exchanged between bus B 150 and bus A 100 may be buffered in cache 132 by caching bus bridge 130. Chipset 152 may be used to connect the agents of bus B 150 with system memory 156 and various input/output devices 154. In one embodiment, processor A 160, processor B 164, and caching bus bridge act as symmetric agents on bus B 150, and chipset 152 acts as a priority agent on bus B 150.

In other embodiments, there may be additional or other kinds of symmetric agents on bus A 100 than just processor 0 110, and they may be processors, chipsets, bus bridges, or any other kinds of symmetric agents. In other embodiments, there may be other kinds of modified priority agents on bus A 100 instead of caching bus bridge 130, such as processors, chipsets, or any other kind of modified priority agent.

Figure 2:
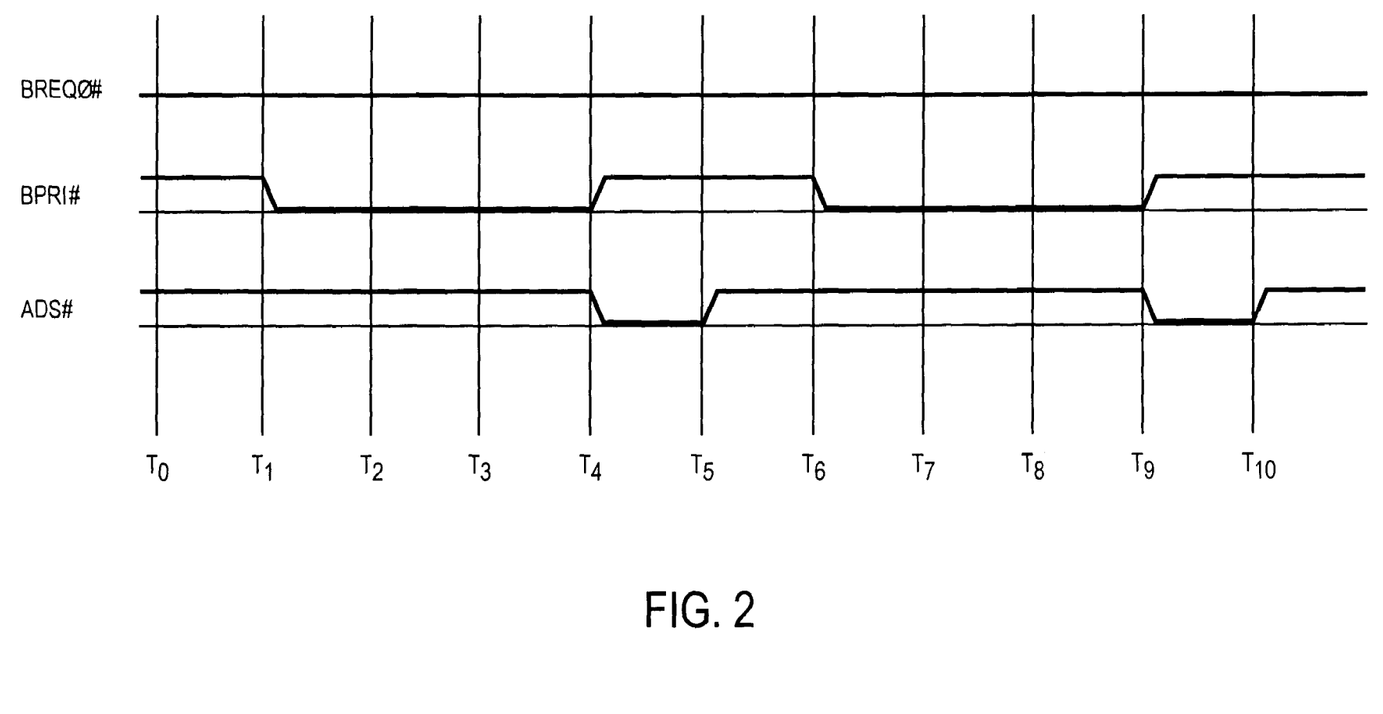
FIG. 2 is a timing diagram of a priority agent bus request, according to one embodiment.

Referring now to FIG. 2, a timing diagram of a priority agent bus request is shown, according to one embodiment. Bus clock time periods are shown starting at times T0 through T10. In the FIG. 2 embodiment, the symmetric agent that may assert BREQ0# has parked on the bus. For this reason BREQ0# is shown asserted from time T0 through T10.

Because BREQ0# is shown constantly asserted, when an agent asserts BPRI# at time T1, the bus protocol may require that three clock periods elapse until the agent may assert the address strobe ADS# signal at T4, initiating the data transfer. Here BPRI# is first asserted at time T1, and the corresponding ADS# strobe is first asserted at T4. The data transfer takes place in the clock time period between T4 and T5.

After a one clock time period, BPRI# may be asserted again, in this case at time T6. Because BREQ0# is still asserted, when the agent asserts BPRI# at time T6, the bus protocol may again require that three clock periods elapse until the agent may assert the address strobe ADS# signal at T9. Since it is possible that BREQ0# will continue to be asserted, for each data transfer there may be required three clock periods between the time BPRI# is asserted and when ADS# may be asserted.

Figure 3:
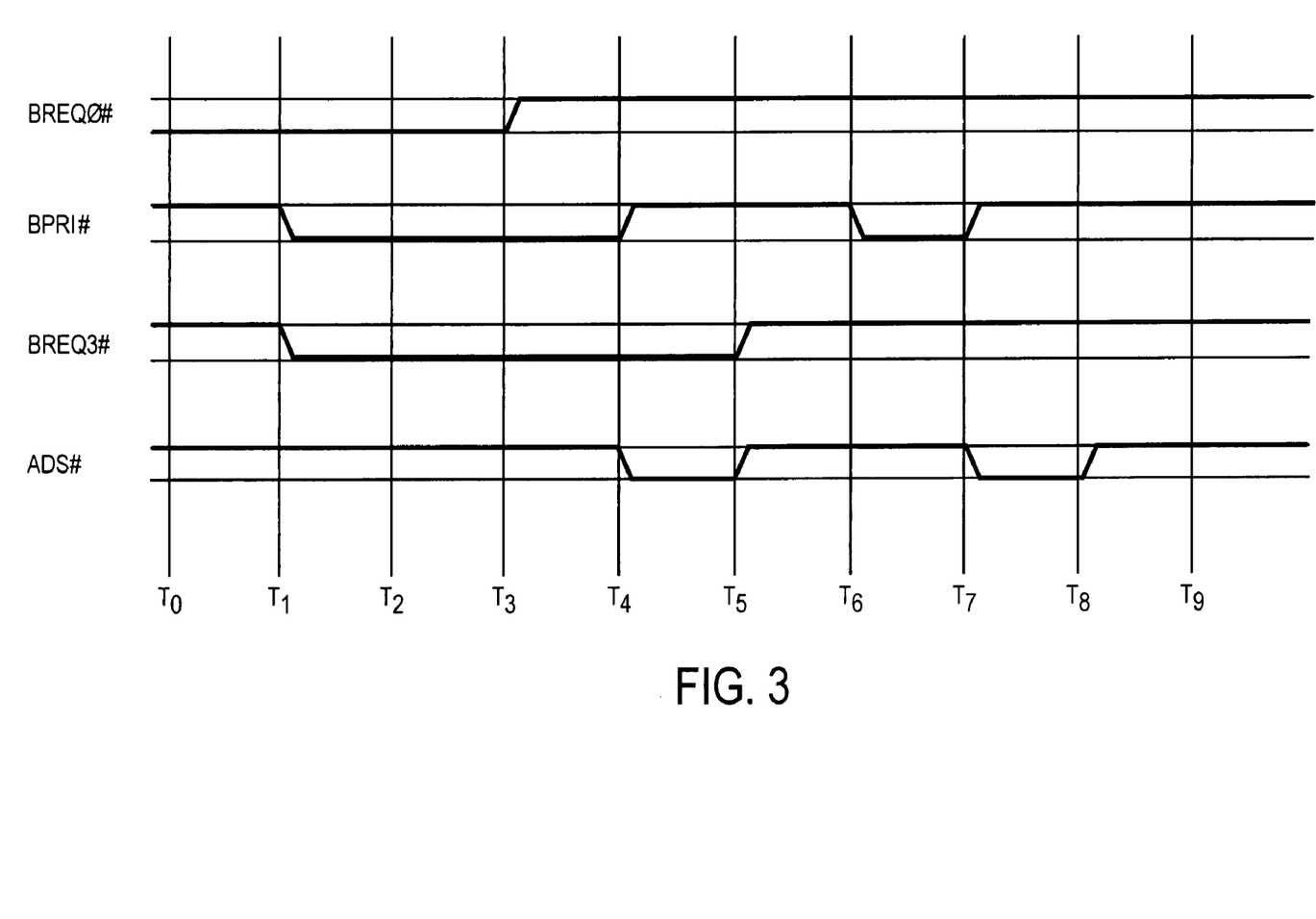
FIG. 3 is a timing diagram of a priority agent bus request, according to another embodiment.

Referring now to FIG. 3, a timing diagram of a priority agent bus request is shown, according to another embodiment. In the FIG. 3 embodiment, the symmetric agent that may assert BREQ0# initially has parked on the bus.

In this embodiment, the agent that asserts BPRI# may also assert BREQ3#. Because BREQ0# is shown initially asserted, when an agent asserts BPRI# and BREQ3# at time Ti, the bus protocol may require that three clock periods elapse until the agent may assert the address strobe ADS# signal at T4, initiating the data transfer. However, the presence of BREQ3# may force the symmetric agent, who asserts BREQ0#, to participate in symmetric access arbitration. Since BREQ0# was left asserted following some previous data transfer, the agent asserting BREQ3# may win the arbitration. BREQ0# should then be de-asserted, as shown here at time T3.

Here BPRI# is first asserted at time T1, and the corresponding ADS# strobe is first asserted at T4. The data transfer takes place in the clock time period between T4 and T5. The agent may in one embodiment assert BREQ3# at least until such time as BREQ0# is found to be de-asserted. In another embodiment, the agent may keep asserting BREQ3# until this data transfer is complete at time T5. This may assist preventing the symmetric agent from re-asserting BREQ0# for a short period of time.

After a one clock time period, BPRI# may be asserted again, in this case at time T6. However, because BREQ0# is no longer asserted, when the agent asserts BPRI# at time T6, the bus protocol may only require that a single clock period elapse until the agent may assert the address strobe ADS# signal at T7. Since BREQ0# is no longer asserted, for each subsequent data transfer there may only be required a single clock period between the time BPRI# is asserted and when ADS# may be asserted.

In the FIG. 3 embodiment, since BREQ0# is no longer asserted at time T6, the agent asserting BPRI# need not assert BREQ3#. However, in other embodiments the agent may generally assert BPRI# and BREQ3# each time the agent desires to transfer data on the bus.

Figure 4:
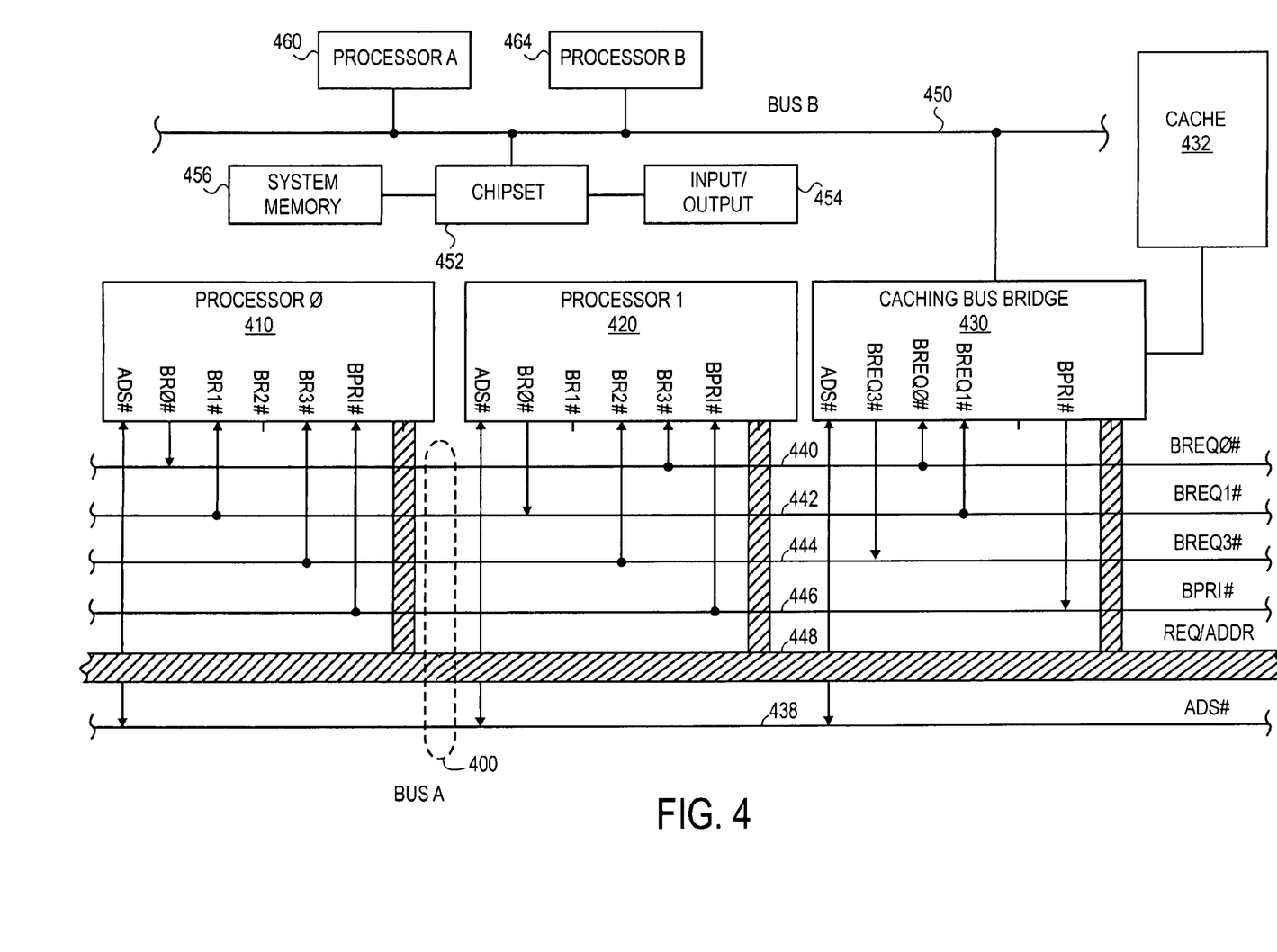
FIG. 4 is a system schematic diagram of system to permit improved performance for priority agent bus requests, according to another embodiment of the present disclosure.

Referring now to FIG. 4, a system schematic diagram of system to permit improved performance for priority agent bus requests is shown, according to another embodiment of the present disclosure. The FIG. 4 system is generally similar to the FIG. 1 system with the addition of a second processor configured as a symmetric agent on bus A 400. In other embodiments, additional symmetric agents, such as a third processor, could be added to the system of FIG. 4.

Processor 0 410 and processor 1 420 may act as symmetric agents on bus A 400. Processor 0 410 may drive its symmetric agent bus request BR0# signal out over bus signal BREQ0# 140, and processor 1 420 may drive its symmetric agent bus request BR0# signal out over bus signal BREQ1#. Processor 0 410 may receive a symmetric agent bus request BR1# signal from bus signal BREQ1# 442, a symmetric agent bus request BR3# signal from bus signal BREQ3# 444, and a priority agent bus request BPRI# signal from bus signal BPRI# 446. Processor 1 420 may receive a symmetric agent bus request BR3# signal from bus signal BREQ0# 440, a symmetric agent bus request BR2# signal from bus signal BREQ3# 444, and a priority agent bus request BPRI# signal from bus signal BPRI# 446. In other embodiments, other symmetric agent bus request and priority agent bus request signals may be used.

Caching bus bridge 430 may generally act as a modified priority agent on bus A 400. In common with existing priority agents, caching bus bridge 430 may drive its priority agent bus request BPRI# signal out over bus signal BPRI# 446 of bus A 400. However, caching bus bridge 130 may also drive a symmetric agent bus request BREQ3# signal out over bus signal BREQ3# 144, and may also receive symmetric agent bus request signals BREQ0# from bus signal BREQ0# 444 and BREQ1# from bus signal BREQ1# 442.

Caching bus bridge 430 may signal its intention to exchange data over bus A 400 by asserting priority agent bus request BPRI# 446 signal. In situations where processor 0 410 has not asserted the BREQ0# 440 signal, and processor 1 420 has not asserted the BREQ1# 442 signal, once caching bus bridge 430 asserts BPRI# 446, it may assert its address strobe ADS# 438 signal one clock cycle later.

However, when processor 0 410 has asserted the BREQ0# 440 signal, once caching bus bridge 430 asserts BPRI# 446, it may need to wait until three clock cycles before it may safely assert its address strobe ADS# 438 signal. Such a waiting period may be enforced by the bus protocol for bus A 400. This may waste two clock cycles to overhead when compared to the situation where processor 0 410 has not asserted the BREQ0# 440 signal. A similar effect may occur when processor 1 420 has asserted the BREQ1# 442 signal.

Processor 0 410 may additionally "park" on bus A 100 by keeping BREQ0# 140 asserted for a considerable period of time. Similarly processor 1 420 may park on bus A 400 by keeping BREQ1# 442 asserted for a period of time. This may be advantageous for processor 0 110 (or processor 1 420) if it wishes to initiate multiple data exchanges in a given period of time. If other symmetric agents do not assert their corresponding symmetric agent bus request signals, processor 0 410 (or processor 1 420) generally does not need to relinquish the bus, and therefore de-assert the BREQ0# 140 (or BREQ1# 442) signal. In either situation, when caching bus bridge 430 merely asserts the BPRI# 446 signal, it may need to wait until three clock cycles have passed before asserting ADS# 438 for each data transfer desired.

Therefore, in one embodiment caching bus bridge 430 may also assert a symmetric agent bus request BREQ3# 444 signal at roughly the same time it asserts the BPRI# 446 signal. It may do this in situations where either processor 0 410 is asserting BREQ0# 440, or processor 1 420 is asserting BREQ1 # 442, but not both. (In cases where both processor 0 410 is asserting BREQ0# 440 and processor 1 420 is asserting BREQ1 # 442, this would indicate an actual symmetric agent arbitration was in progress, rather than a situation where one of the processors is parking on the bus.) If the processor 0 410 is asserting BREQ0# 440, once caching bus bridge 430 asserts BPRI# 446, it may assert its address strobe ADS# 438 signal three clock cycles later. And, since the caching bus bridge 430 is also asserting BREQ3# 444, by the symmetric arbitration rules implemented by bus A 400 this will cause processor 0 410 to relinquish the bus A 400. As part of this relinquishing, processor 0 410 may de-assert BREQ0# 440 and subsequently leave it de-asserted. Similar timings would occur if processor 1 420 was asserting BREQ1# 442. The caching bus bridge 4430 asserting BREQ3# 444 would also cause processor 1 420 to relinquish the bus A 400 and de-assert BREQ1# 442.

In either case, when caching bus bridge 430 next asserts BPRI# 446, it should generally find BREQ0# 440 (and BREQ1 # 442) de-asserted. For this reason, on a second and subsequent data exchange initiated by caching bus bridge 430, when caching bus bridge 430 asserts BPRI# 446 it may assert ADS# 438 signal one clock cycle later, and not three clock cycles later. BREQ0# 440 would generally only be found re-asserted in situations when processor 0 410 (or processor 1 420) would again be actually ready to request the usage of bus A 410.

If the caching bus bridge 430 asserts BREQ3# 444 when neither BREQ0# 440 nor BREQ1# 442 are asserted, this should not cause the bus A 400 to take any particular action, as an actual symmetric agent driving BREQ3# 444 is not present. However, in one embodiment, caching bus bridge 430 may receive and examine the status of BREQ0# 440 and BREQ1# 442 on two bus request input lines. In this embodiment, caching bus bridge 430 may only assert BREQ3# 444 when either BREQ0# 440 or BREQ1# 442, but not both, are determined to be asserted.

Figure 5:
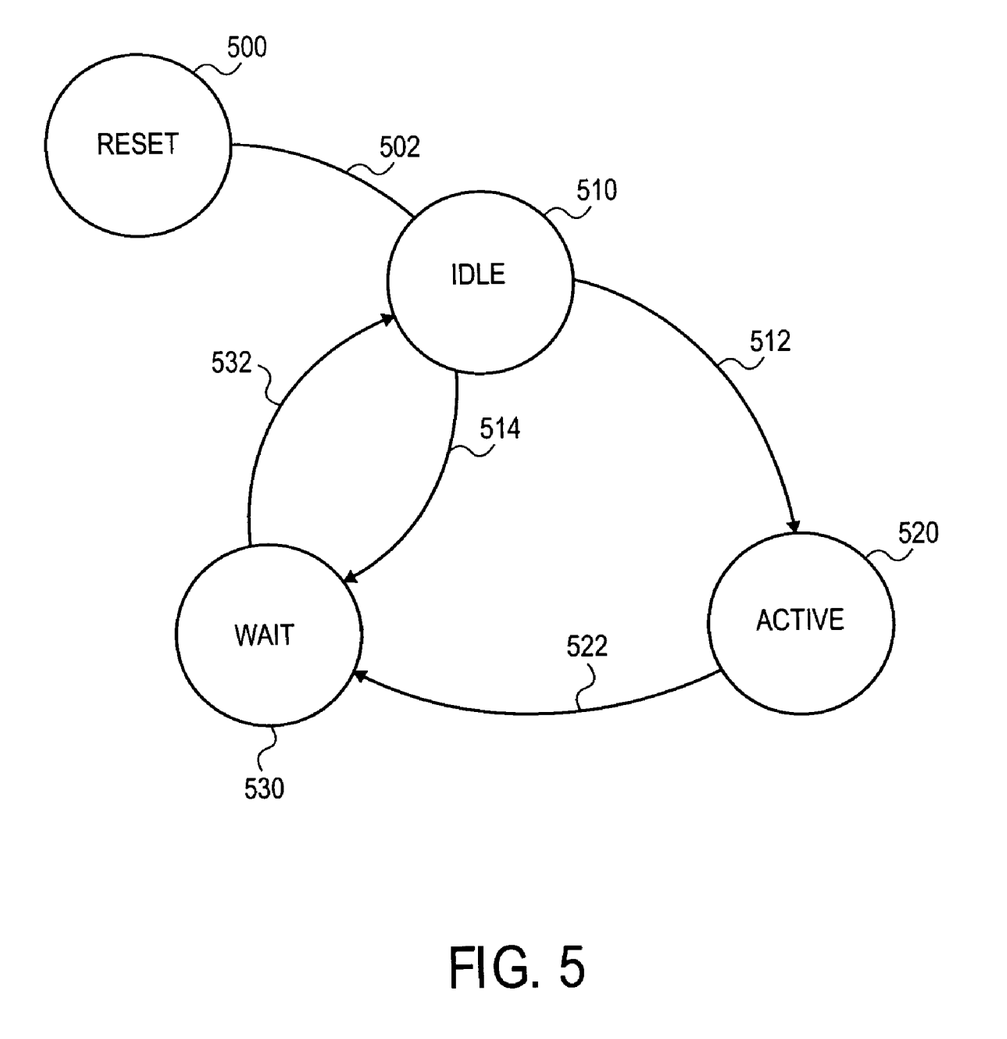
FIG. 5 is a state diagram for using priority agent bus requests, according to one embodiment of the present disclosure.

Referring now to FIG. 5, a state diagram for using priority agent bus requests is shown, according to one embodiment of the present disclosure. The state diagram may show the processes within a state engine that implements the functions of a modified priority agent as discussed above in connection with FIGS. 1 through 4. The process may be entered upon a system reset event at RESET 500. Then a GoToIDLE 502 transition may automatically occur, leaving the process in IDLE 510.

From IDLE 510, a GoToWAIT 514 transition may occur when two additional conditions exist: when BREQ0# is not asserted and when the modified priority agent does not assert BPRI#. From WAIT 530, a GoToIDLE 532 transition may occur when additionally the modified priority agent does not assert BPRI#.

The GoToWAIT 514 and GoToIDLE 532 transitions may follow one another until such time as BREQ0# is observed to be asserted. Then from IDLE 510 a GoToACTIVE 512 transition may occur when two additional conditions exist: when BREQ0# is observed asserted and when the modified priority agent asserts BPRI#.

When in the ACTIVE 520 state, BREQ3# is asserted. The ACTIVE 520 state may be exited by a GoToWAIT 522 transition. From ACTIVE 520 a GoToWAIT 522 transition may occur when additionally BREQ0# is not observed asserted. Then the WAIT 530 and IDLE 510 states may alternate until such time as BREQ0# is again observed to be asserted.

In other embodiments, other state engines may implement the actions of the modified priority agents of the present disclosure. Specifically, different states and rules for transitions between states may be used.

Figure 6:
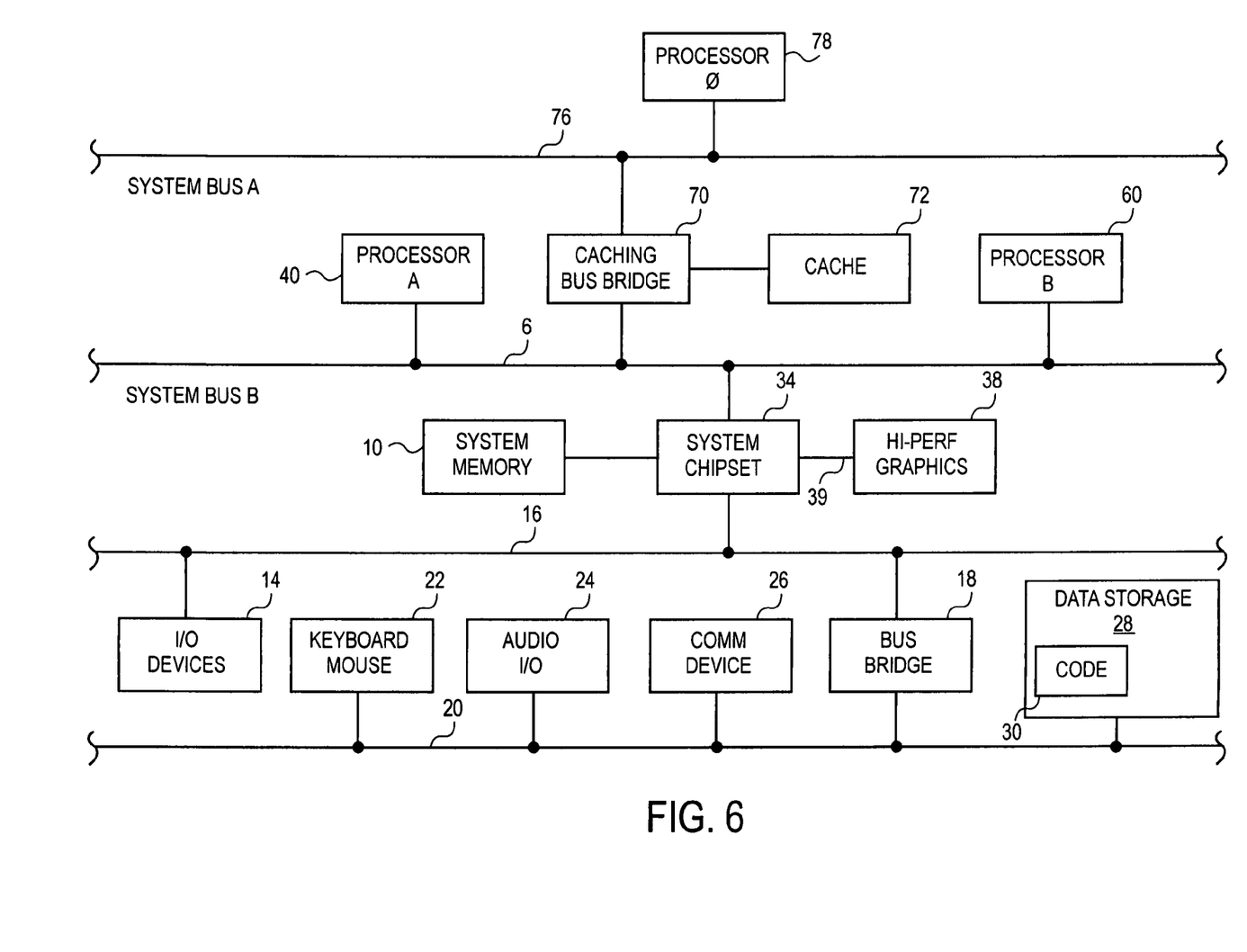
FIG. 6 is a system schematic diagram of a system including processors and a chipset coupled to two system busses, according to one embodiment of the present disclosure.

Referring now to FIG. 6, a system schematic diagram of a system including processors and a chipset coupled to two system busses is shown, according to one embodiment of the present disclosure. The FIG. 6 system may include several processors, of which only three, processor A 40, processor B 60, and processor 0 78 are shown for clarity. Processor 0 78 and caching bus bridge 70 may exchange data over a system bus A 76. Caching bus bridge 70 may temporarily store data in cache 72. In other embodiments, other processors, bus bridges, and other bus agents may be connected via system bus A 76. In one embodiment, system bus A 76 may be a front side bus (FSB) utilized with Pentium® class microprocessors manufactured by Intel® Corporation. In other embodiments, other busses may be used. In one embodiment, system bus A 76 may be the bus A 100 of FIG. 1.

The FIG. 6 system may have several functions connected via a system bus B 6. Processor A 40, processor B 60, chipset 34, and caching bus bridge 70 may be connected via system bus B 6, but in other embodiments different numbers and kinds of processors, chipsets, bus bridges, and other agents may be used. In one embodiment, system bus B 6 may be a front side bus (FSB) utilized with Pentium® class microprocessors manufactured by Intel® Corporation. In other embodiments, other busses may be used. In some embodiments a memory controller and bus bridge may be implemented in chipset 34. In some embodiments, these functions of chipset 34 may be divided among physical chips differently than as shown in the FIG. 6 embodiment.

Chipset 34 may permit processor A 40, processor B 60, and caching bus bridge 70 to read and write from system memory 10. Chipset 34 may include a bus interface to permit memory read and write data to be carried to and from bus agents on system bus B 6. Chipset 34 may also connect with a high-performance graphics circuit 38 across a high-performance graphics interface 39. In certain embodiments the high-performance graphics interface 39 may be an advanced graphics port AGP interface. Chipset 34 may direct data from system memory 10 to the high-performance graphics circuit 38 across high-performance graphics interface 39.

In the FIG. 6 system, bus bridge 32 may permit data exchanges between system bus B 6 and bus 16, which may in some embodiments be a industry standard architecture (ISA) bus or a peripheral component interconnect (PCI) bus. In the system, there may be various input/output I/O devices 14 on the bus 16, including in some embodiments low performance graphics controllers, video controllers, and networking controllers. Another bus bridge 18 may in some embodiments be used to permit data exchanges between bus 16 and bus 20. Bus 20 may in some embodiments be a small computer system interface (SCSI) bus, an integrated drive electronics (IDE) bus, or a universal serial bus (USB) bus. Additional I/O devices may be connected with bus 20. These may include keyboard and cursor control devices 22, including mice, audio I/O 24, communications devices 26, including modems and network interfaces, and data storage devices 28. Software code 30 may be stored on data storage device 28. In some embodiments, data storage device 28 may be a fixed magnetic disk, a floppy disk drive, an optical disk drive, a magneto-optical disk drive, a magnetic tape, or non-volatile memory including flash memory.

In the foregoing specification, the invention has been described with reference to specific embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An agent, comprising:
   a data interface to convey data on a bus;
   a first interface to assert a first priority agent bus request; and
   a second interface to assert a first symmetric agent bus request in conjunction with said first priority agent bus request.

2. The agent of claim 1, wherein data interface is to assert said data subsequent to said first interface beginning to assert said first priority agent bus request.

3. The agent of claim 2, wherein said data interface is to issue said data subsequent to said second interface initially asserting said first symmetric agent bus request.

4. The agent of claim 1, further comprising a third interface to receive a second symmetric agent bus request.

5. The agent of claim 4, wherein said second interface is to assert said first symmetric agent bus request responsive to said third interface receiving said second symmetric agent bus request.

6. The agent of claim 4, wherein said second interface is to not assert said first symmetric agent bus request when said third interface is not receiving said second symmetric agent bus request.

7. The agent of claim 1, wherein said first symmetric agent bus request to be de-asserted at an end of a transmission of said data.

8. A method, comprising:
   asserting a first priority agent bus request from an agent;
   asserting a first symmetric agent bus request from said agent; and
   transferring data on a bus after initiating said first priority agent bus request and initiating said first symmetric agent bus request.

9. The method of claim 8, wherein said asserting a first symmetric agent bus request is responsive to detecting a second symmetric agent bus request.

10. The method of claim 9, wherein said asserting a first symmetric agent bus request is inhibited when said second symmetric agent bus request is not detected.

11. The method of claim 10, wherein said first symmetric bus request is maintained through said transferring data.

12. A system, comprising:
   a first agent including a data interface to convey data on a first bus, a first interface to assert a first priority agent bus request, and a second interface to assert a first symmetric agent bus request in conjunction with said first priority agent bus request; and
   a second agent including a third interface to receive said first priority agent bus request, and a fourth interface to receive said first symmetric agent bus request.

13. The system of claim 12, wherein said data interface is to issue said data subsequent to said first interface initially asserting said first priority agent bus request.

14. The system of claim 13, wherein said data interface is to issue said data subsequent to said second interface initially asserting said first symmetric agent bus request.

15. The system of claim 12, wherein said first agent includes a fifth interface to receive a second symmetric agent bus request from said second agent.

16. The system of claim 15, wherein said second interface is to assert said first symmetric agent bus request responsive to said fifth interface receiving said second symmetric agent bus request.

17. The system of claim 15, wherein said second interface is to not assert said first symmetric agent bus request when said fifth interface is not receiving said second symmetric agent bus request.

18. The system of claim 15, wherein said second agent includes a sixth interface to park said second symmetric agent bus request.

19. The system of claim 18, wherein said sixth interface is to de-assert said second symmetric agent bus request responsive to said second interface asserting said first symmetric agent bus request.

20. The system of claim 12, wherein said first symmetric agent bus request to be de-asserted at an end of a transmission of said data.

21. The system of claim 12, further comprising a second bus, wherein said first agent further includes an interface to said second bus.

22. The system of claim 21, further comprising an audio input/output device, wherein said second bus is coupled to said audio input/output device.

23. An apparatus, comprising:
   means for asserting a first priority agent bus request from an agent;
   means for asserting a first symmetric agent bus request from said agent; and
   means for transferring data on a bus after initiating said first priority agent bus request and initiating said first symmetric agent bus request.

24. The apparatus of claim 23, wherein said means for asserting a first symmetric agent bus request is responsive to means for detecting a second symmetric agent bus request.

25. The apparatus of claim 24, wherein said means for asserting a first symmetric agent bus request is inhibited when said second symmetric agent bus request is not detected.

26. The apparatus of claim 25, wherein said first symmetric bus request is maintained until said means for transferring data stops transferring data.

* * * * *